United States Patent [19]

Dischert et al.

[11] 4,376,948
[45] Mar. 15, 1983

[54] TDM SCHEME FOR DIGITAL VIDEO PROCESSING

[75] Inventors: Robert A. Dischert, Burlington; James J. Williams, Jr., Plainsboro; Glenn A. Reitmeier, Trenton, all of N.J.

[73] Assignee: RCA Corporation, New York, N.Y.

[21] Appl. No.: 228,596

[22] Filed: Jan. 26, 1981

[51] Int. Cl.³ .............................................. H04N 9/32
[52] U.S. Cl. .......................................... 358/13; 370/6
[58] Field of Search .................... 358/13, 12; 370/108, 370/6, 112; 364/178

[56] References Cited
U.S. PATENT DOCUMENTS
3,795,763 3/1974 Golding et al. ....................... 358/13
4,218,697 8/1980 Leventer ................................ 358/13
4,227,204 10/1980 Rossi ..................................... 358/13

Primary Examiner—Richard Murray
Attorney, Agent, or Firm—E. M. Whitacre; W. H. Meise; H. I. Steckler

[57] ABSTRACT

A TDM scheme has a Y signal that is sampled at 14.32 MHz and every other sample is discarded. The discarded samples are 180° out-of-phase from line-to-line. I and Q signals are sampled at one half this frequency and every other sample is discarded also 180° out-of-phase from line-to-line on a given line. The discarded samples of Q and I are 180° out-of-phase with respect to each other. This allows insertion of the retained I and Q samples into the retained Y samples to allow multiplexing.

21 Claims, 8 Drawing Figures

TDM SCHEME FOR DIGITAL VIDEO PROCESSING

BACKGROUND OF THE INVENTION

The present invention relates to TDM (time division multiplexing), and more particularly to a TDM scheme for use with a digital video signal.

In digital video systems, a video signal is digitized (sampled and then quantized) before further processing. In order to achieve adequate horizontal and vertical resolution at a reasonable sampling rate at the possible expense of diagonal resolution, the sampling signal can have a 180 degree phase shift between adjacent television scanning lines. Such a sampling scheme is used in sub-Nyquist encoding such as disclosed in "Sub-Nyquist Encoded PCM NTSC Color Television" by John P. Rossi in the book "Digital Video," a review of SMPTE papers, and in a system known as "2+2" disclosed in U.S. patent application Ser. No. 168,077 filed July 14, 1980 in the names of R. A. Dischert and G. A. Reitmeier entitled "Data Rate Reduction for Digital Video Signals by Subsampling and Adaptive Reconstruction," and assigned to the assignee of the present application. In the "2+2" system every other sample is discarded and steering bits are transmitted that indicate which combination of surrounding samples is the closest match to a discarded sample. Because of said phase shift, the position of the sampling instants on a display screen form a "checkerboard" pattern as shown in FIG. 2 of said application.

The above-described sampling operation can be applied either to the composite television signal or to component television signals, such as Y, I, and Q or Y, R-Y, and B-Y. Because of the greater bandwidth of the luminance (Y) signal as compared to the chroma signals (I, Q, R-Y, and B-Y) it is typical to sample the Y signal at a rate twice that of chroma signals. For further processing it is necessary to transmit the component signals within a television studio and possibly between studios. Further it may be necessary to transmit steering bits. If so, it is desirable to transmit a single set of steering bits for all three component signals such as disclosed in U.S. patent application Ser. No. 171,379, filed July 23, 1980 in the names of R. A. Dischert and G. A. Reitmeier and assigned to the assignee of the present application. However even if only a single set of steering bits, or even no such bits are transmitted, parallel transmission of all three or four signals is wasteful of interconnecting channels or cables. Further in the above-mentioned systems, the samples may not occur at regular intervals either within or between lines, thus making decoding difficult.

It is therefore an object of the present invention to provide a TDM system, particularly one useful with a digitized television signal.

It is another object to provide a TDM system that is easy to decode.

SUMMARY OF THE INVENTION

Method and apparatus for time multiplexing three component signals representing a television picture, said method and apparatus comprising sampling said component signals with a frequency ratio of 2:1:1 respectively, each component signal having a phase shifted sampling clock from line to line, the lower sampling frequency component signals having a mutual phase shift of the sampling clock on corresponding lines, time delaying the samples of the lower sampling frequency component signals on alternate lines, and applying the delayed and undelayed samples of the lower sampling frequency component signals and the samples of the higher sampling frequency component signal to a single channel.

DETAILED DESCRIPTION

Figure 1:
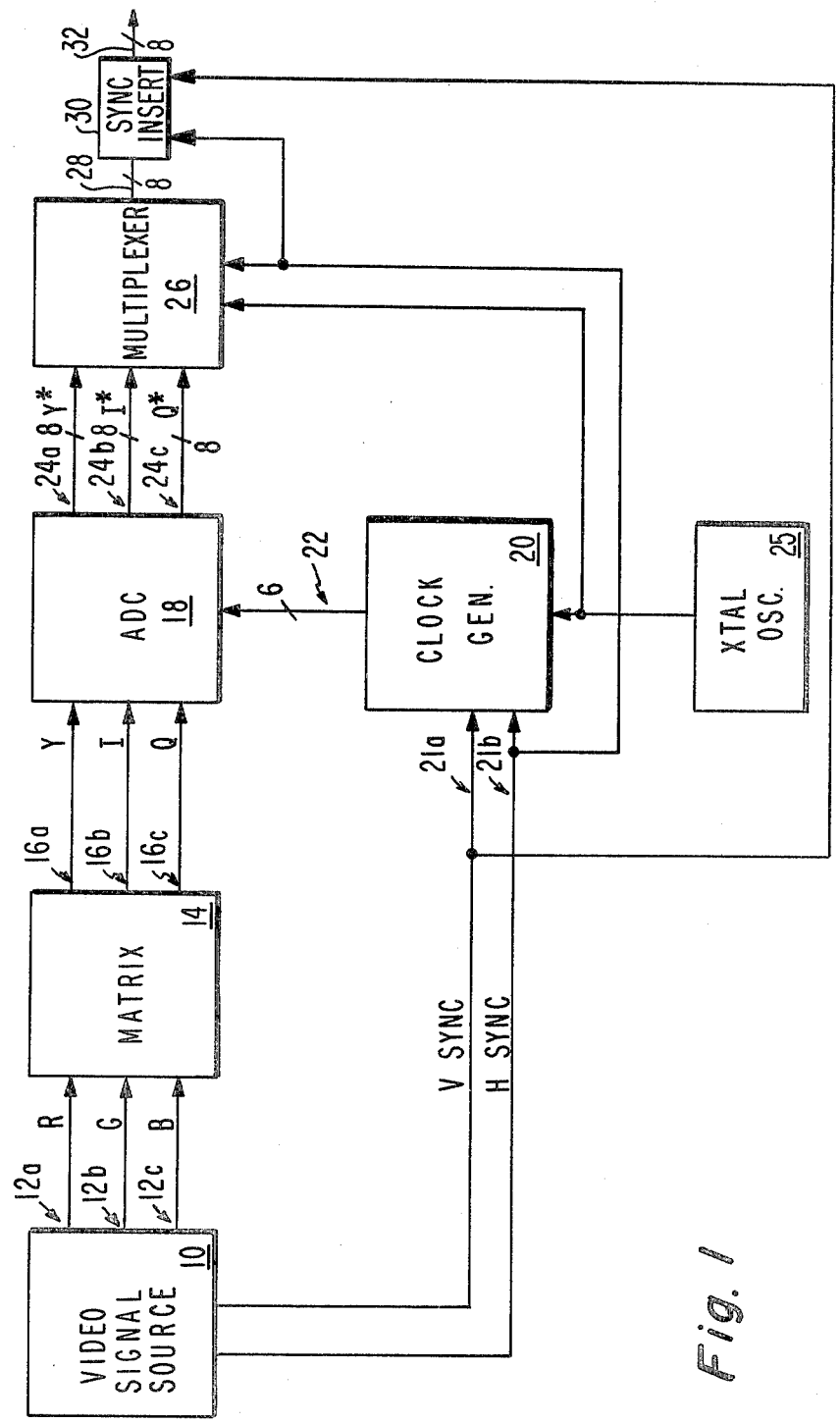
FIG. 1 is a block diagram of a time division multiplexer system in accordance with the invention.

FIG. 1 shows a block diagram of a system in accordance with the invention. A video signal source 10 typically comprises a television camera, but can also be a video tape recorder or some other source. Source 10 provides red (R), green (G), and blud (B) components of an analog video signal on output lines 12a, 12b, and 12c respectively to matrix 14. Matrix 14 matrixes the red, green and blue component signals to form analog luminance (Y) and in phase and quadrature (I and Q respectively) color signals at outputs 16a, 16b and 16c respectively. The Y, I, and Q signals are applied to analog-to-digital converter (ADC) 18 (described in more detail below). ADC 18 also receives six clock signals from clock generator 20 (described below) on six-bit bus 22. It is noted that generator 20 receives horizontal and vertical synchronization signals from source 10 on lines 21b and 21a respectively, as well as a stable frequency reference signal from crystal oscillator 25 of 14.32 MHz, which is four times the frequency of the color subcarrier. Under the control of said clock signals on bus 22, the analog Y, I, and Q signals are individually digitized (sampled and then eight-bit quantized) by ADC 18 and then every other sample is discarded. The result is a digitized luminance signal and digitized in phase and quadrature color signals Y*, I*, and Q* respectively (where the star notation indicates digital signals) that are applied to time division multiplexer 26 (described below) over eight-bit buses 24a, 24b, and 24c, respectively. Multiplexer 26 also receives horizontal sync from source 10 and the stable reference signal from oscillator 25. Multiplexer 26 time multiplexes the Y*, I*, and Q* signals onto an eight-bit line 28 that is connected to a sync inserter circuit 30. Circuit 30 inserts a code word or sequence of code words such as Barker codes representing horizontal and vertical sync into the multiplexed data stream. Eight-bit output bus 32 conveys the data stream to a communications channel. Instead of circuit 30, bus 32 can comprise 9 bits, the extra line conveying the sync signals. Thus there has been a reduction in the required number of cables from 24 (3 signals × 8 bits/signal) to 8 or 9. Further multiplexing into a 1-bit channel can be done if required. This can be done in a conventional manner.

Figure 2:
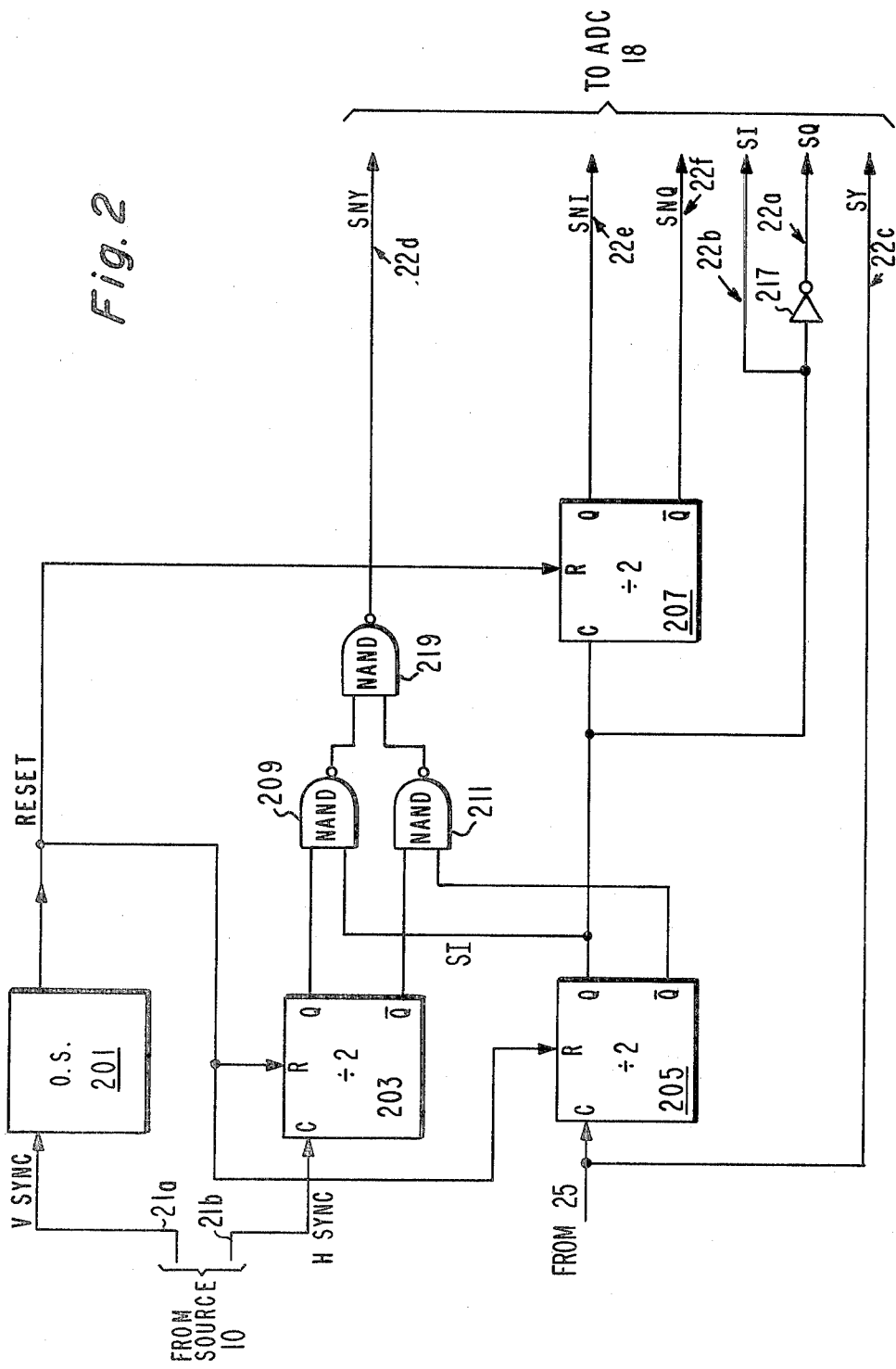
FIG. 2 is a circuit diagram of a clock generator used in FIG. 1.

FIG. 2 shows the details of clock generator 20. The vertical sync signal from source 10 present on line 21a is applied to one shot (monostable multivibrator) 201. One shot 201 provides an output signal having a duration greater than one half of a horizontal line period (about 30 microseconds). This output signal is applied to the reset inputs of flip-flops 203, 205 and 207, thereby preventing said flip-flops from being set at the beginning of every other field due to the one half line interval between the vertical sync pulse and the next horizontal sync pulse that occurs every other field. The horizontal sync signal on line 21b is applied to the clock input of flip-flop 203, which flip-flop acts as a divide-by-two frequency divider. Thus out-of-phase half line frequency signals from the Q and $\overline{Q}$ outputs of flip-flop 203 are applied to respective first inputs of NAND gates 209 and 211. The signal from crystal oscillator 25 is designated SY and is shown in FIG. 3c. It is noted that this signal is the same for both odd and even lines. Signal SY is applied to line 22c of bus 22 as well as to the clock input of flip-flop 205. Flip-flop 205 divides the frequency of signal SY in half to produce at its Q output terminal a 7.16 MHz SI signal and an out-of-phase SI signal at its $\overline{Q}$ output which are applied to the respective second inputs of NAND gates 209 and 211. The SI signal is shown in FIG. 3a, where it will be seen that it is the same for odd and even lines. The two out-of-phase 7.16 MHz SI signals are passed by NAND gates 209 and 211 on alternate lines to NAND gate 219, which gate 219 combines them into signal SNY present on line 22d and shown in FIG. 3f. It is noted that the phase of SNY alternates from line to line and the frequency is one-half that of signal SY. Signal SI is applied to line 22b and also to inverter 217 and thence to line 22a. The signal on line 22a is called SQ and is shown in FIG. 3b, again noting that it is the same for odd and even lines. The SI signal is also applied to the clock input of flip-flop 207, which flip-flop 207 divides the signal frequency by two to provide at its Q and $\overline{Q}$ outputs out-of-phase 3.58 MHz signals. The two 3.58 MHz signals are applied to lines 22e and 22f. The signal on line 22e is called signal SNI and is shown in solid lines in FIG. 3d. The signal on line 22f is called signal SNQ, which signal is shown in solid lines in FIG. 3e. Signals SNI and SNQ phase alternate from line to line as shown in FIGS. 3d and 3e respectively and have frequencies one half (3.58 MHz) that of the frequency (7.16 MHz) of signals SI and SQ.

Figure 4:
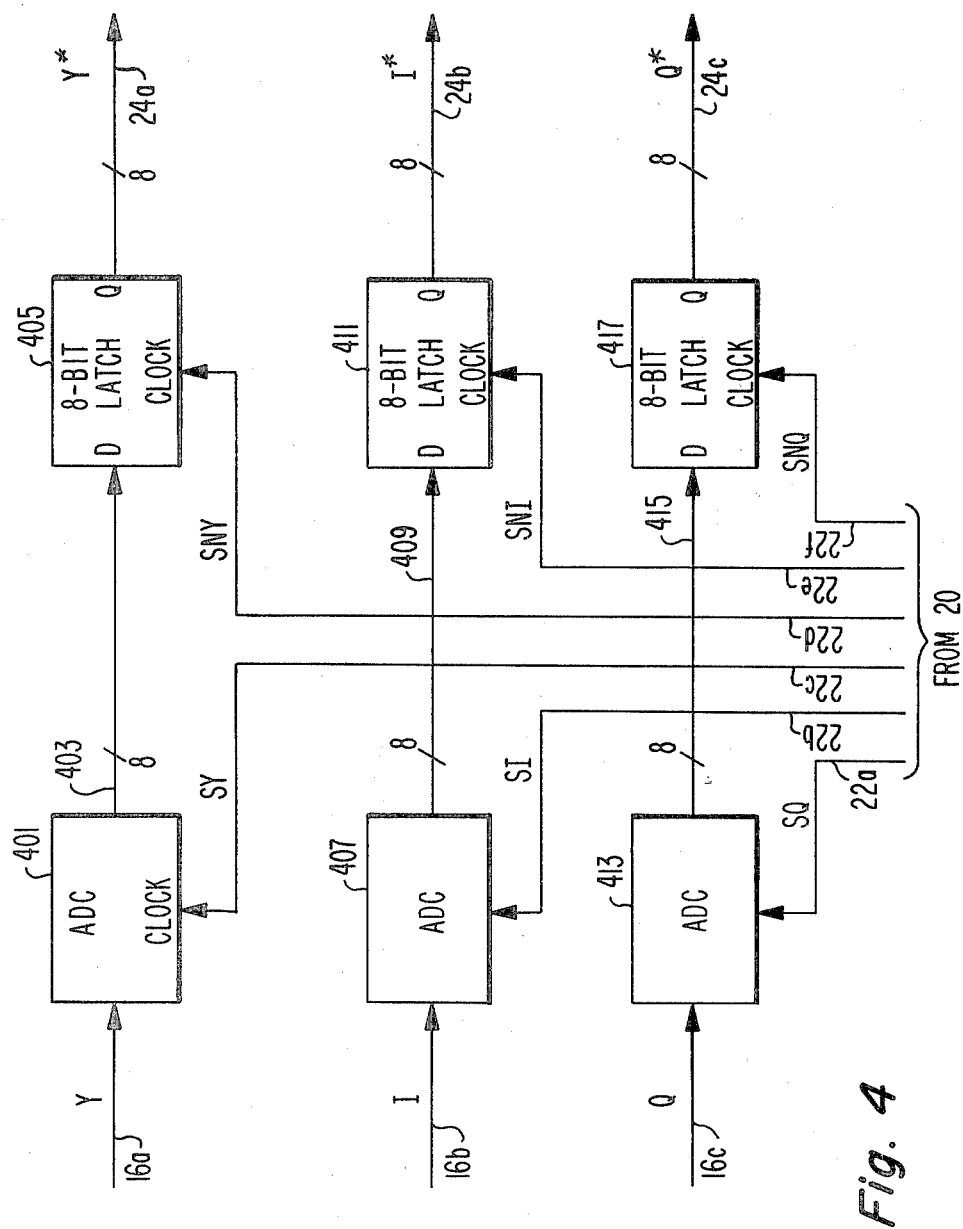
FIG. 4 is a block diagram of an analog-to-digital converter circuit used in FIG. 1.

FIG. 4 shows details of ADC 18. The SY signal on line 22c is applied to a clock input of ADC 401. ADC 401 also receives the Y signal present on line 16a, which is sampled by ADC 401 on the positive going edge of sampling signal SY. The sampled Y signal is then quantized within ADC 401 to an eight-bit accuracy (256 grey levels). The 8-bits are applied using 8-bit bus 403 to eight-bit latch 405. By "eight-bit latch" is meant 8 latches (which are a type D flip-flop), one latch coupled to each of the lines of the 8-bit bus. The positive going edge of signal SNY causes latch 405 to store the signal on bus 403 and provide said signal at its Q output to 8-bit bus 24a. Since the signal SNY has only one-half the frequency of signal SY, one half of the samples generated by ADC 401 are not transmitted to bus 24a. Further since the phase of the signal SNY alternates from line to line, the time position of the samples also alternates for odd and even lines, as shown in FIG. 5c. It is noted that FIGS. 5a, b, and c show the time positions for both the odd and even lines of the samples comprising the I*, Q*, and Y* signals respectively on buses 403, 409, and 415 respectively. FIG. 5d does the same for the multiplexed signal M* described below on bus 28. Here to odd and even line samples are designated with odd and even numbers (500–509) respectively.

Exactly the same operation as described above takes place with respect to the I signal, ADC 407 and signal SI, 8-bit bus 409, 8-bit latch 411, and bus 24b. The only difference being that the frequency of signals SI and SNI are one-half those of signals SY and SNY respectively. Thus the samples 511 through 515 on bus 24b and shown in FIG. 5a occur at one-half the rate of the Y* signal samples 500–509. Similarly, the same operation as described above for the Y signal takes place with respect to the Q signal, ADC 413, signal SQ, 8-bit bus 415, 8-bit latch 417, and bus 24c. Again, the only difference being that the frequency of the signals SQ and SNQ are one-half those of signals SY and SNY respectively. Thus the Q* signal samples 516 through 520 on bus 24c and shown in FIG. 5b occur at one-half the rate of the Y* signal samples 500–509, and therefore at the same rate as that of the I* samples 511–515. For FIGS. 5a and 5b odd and even numbered samples occur on odd and even numbered lines.

Figure 6:
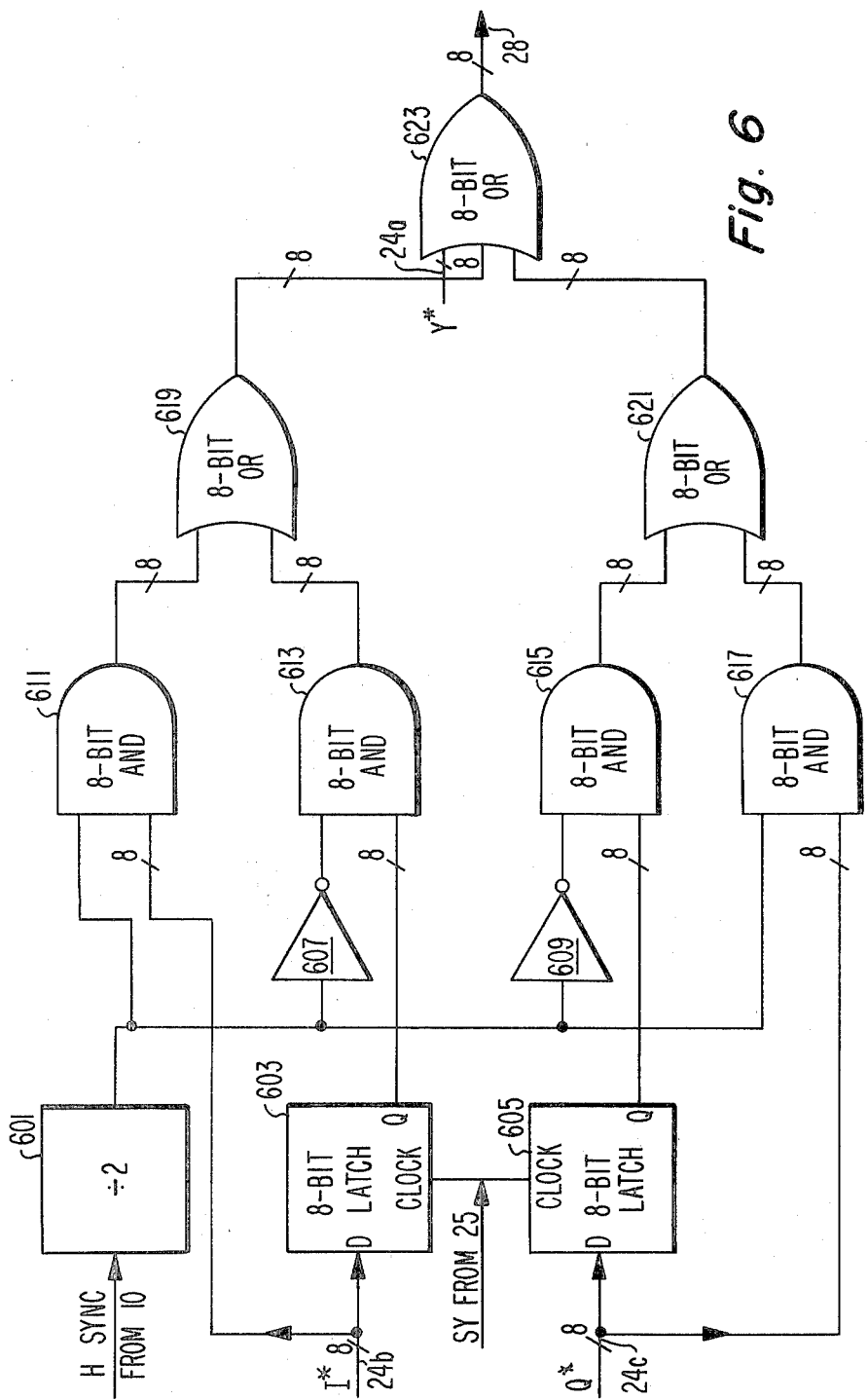
FIG. 6 is a circuit diagram of a multiplexer used in FIG. 1.

FIG. 6 shows the details of multiplexer 26. The I* and Q* 8-bit signals on buses 24b and 24c respectively are applied to the D inputs of 8-bit latches 603 and 605 respectively and to the second inputs of 8-bit AND gates (8 AND gates, one for each bit) 611 and 617 respectively. The 14.32 MHz SY reference signal from oscillator 25 is applied to the clock inputs of latches 603 and 605. The positive going edges of reference signal SY cause the I* and Q* signals to appear at the Q outputs of latches 603 and 605 respectively from which they are supplied to the second inputs of 8-bit AND gates 613 and 615 respectively, but with a delay of about 70 n.s. (nanoseconds) (one period of 14.32 MHz) as compared with the respective input signals I* and Q* that are applied to gates 611 and 617 respectively. The horizontal sync pulse from source 10 is applied to a divide-by-two frequency divider 601 that provides a half line frequency signal to the first inputs of gates 611 and 617 and to inverters 607 and 609, which inverters apply an inverted version of said half line frequency signal to first input terminals of gates 613 and 615.

Figure 5:
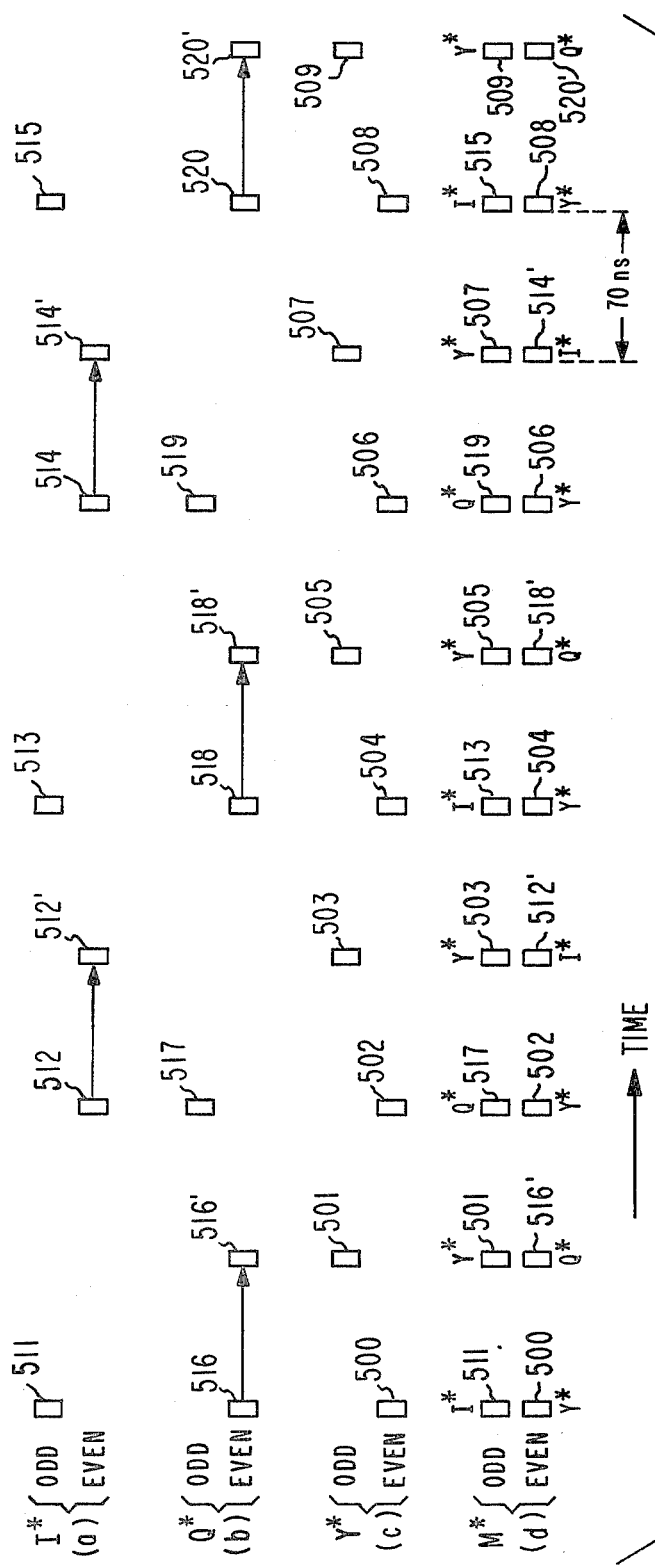
FIG. 5 is a timing diagram useful in explaining the operation of the multiplexer of FIG. 1.

In operation gates 611 and 617 are enabled on alternate lines by the half line frequency signals applied to their respective first inputs, while during the remaining alternate lines, gates 613 and 615 are enabled by the half line frequency signals applied to their first inputs by inverters 607 and 609. Thus during the odd lines, the undelayed I* signal samples on bus 24b are passed by gate 611 to the first input of 8-bit OR gate (8 OR gates, one for each bit) 619. During the even lines, gate 613 passes the delayed samples from latch 603 to the second input of gate 619. In FIG. 5 the delayed samples are indicated with a prime applied to the number representing the original undelayed sample, e.g. 512', 514', etc. Thus the output from gate 619 sequentially comprises the samples 511, 513, 515, etc. for the odd lines and 512', 514', etc. for the even lines, see FIG. 5a.

The operation of the multiplexer of FIG. 6 with respect to latch 605, inverter 609, and gates 615, 617 and 621 for the Q* signal is similar to the operation as described above for the I* signal. Thus the output of 8-bit OR gate 621 sequentially comprises the samples 517, 519, etc. for the odd lines, and 516′, 518′, 520′, etc. for the even lines, see FIG. 5b.

As shown in FIG. 6, the above-described I* and Q* signals are applied to second and third inputs of 8-bit OR gate 623, while the Y* signal is applied to the first input thereof. The output of gate 623 is the final multiplexed signal called "M" in FIG. 5d. For the odd lines it sequentially comprises samples 511, 501, 517, 503, 513, 505, 519, 507, 515, 509, etc., which is the signal sequence I*, Y*, Q*, Y*, I*, Y*, Q*, etc. as indicated. For the even lines it sequentially comprises the samples 500, 516′, 502, 512′, 504, 518′, 506, 514′, 508, 520′, etc. which is the signal sequence Y*, Q*, Y*, I*, Y*, Q*, Y*, I*, etc. as indicated.

It will be seen that samples of the Y* and the color component signals I* and Q* coincide for the even lines, e.g. samples 500 and 516 for Y* and Q* signals, and samples 502 and 512 for Y* and I* signals. Thus in the present invention the I* and Q* samples for the even lines are delayed to avoid the time coincidence and so allow time multiplexing. Further it will be noted that the time multiplexing which occurs makes the odd and even lines have the same sample sequence except for a phase shift.

Figure 7:
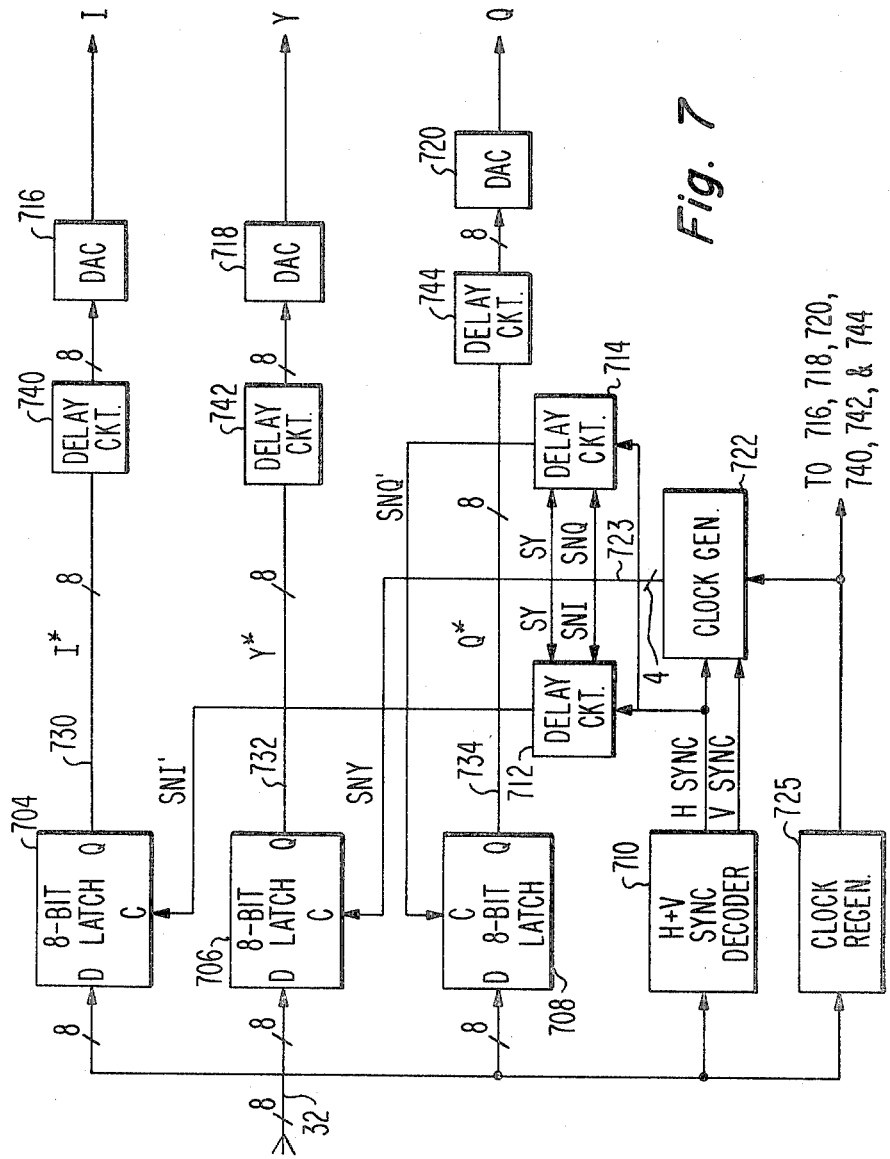
FIG. 7 is a block diagram of a time division demultiplexer system for use with the apparatus of FIG. 1.

FIG. 7 shows a block diagram of a demultiplexer for use when the multiplexer of FIG. 1 is used to record or transmit video information. Bus 32 supplies the reproduced signal to the D inputs of 8-bit latches 704, 706, and 708, for the I, Y and Q signals respectively. In order for proper demultiplexing to take place, the latches must be enabled to receive data only when the respective signals are present on bus 32 by receiving an enabling signal at their respective clock (C) inputs.

To generate the required enabling signals, a decoder 710 of horizontal and vertical sync signals is provided. If a separate line or bus 32 is provided for sync signals, then decoder 32 comprises a sync separator. The horizontal and vertical sync signals are applied to clock generator 722, which is the same as clock generator 20 shown in FIG. 2. The horizontal sync signal is also applied to delay circuits 712 and 714 (described below). A clock regenerator 725 provides from bus 32 a stable reference signal to generator 722 as well as to delay circuits 740, 742, and 744 and to DACs (digital-to-analog converters) 716, 718, and 720.

Generator 722 provides four signals SY, SNI, SNQ, and SNY, as shown in solid lines in FIGS. 3c 3d, 3e and 3f respectively, on 4-bit bus 723. The SY signal is applied to delay circuits 712 and 714 as well as to the C input of latch 706 for enablement thereof. Because of the 70 ns delay that is applied to the even line samples of the I* and Q* signals as shown in FIG. 5 and described above, the SNI and SNQ signals cannot be directly applied to latches 704 and 708 respectively for proper demultiplexing to occur. Instead, said signals are applied to delay circuits 712 and 714 respectively, which circuits provide signals SNI′ and SNQ′ respectively, as shown in dotted lines in FIGS. 3d and 3e respectively. These figures show that the signals SNI′ and SNQ′ are delayed by 70 ns with respect to signals SNI and SNQ respectively on the even lines. For the odd lines signals SNI and SNQ are the same as signals SNI′ and SNQ′ respectively. The signals SNI′ and SNQ′ are applied to the C inputs of latches 704 and 708 respectively.

In operation, the positive going edges of the signals SNY, SNI′ and SNQ′ cause the latches to which they are applied to store the signal that is present on bus 32. Referring to FIGS. 3d, 3e, and 3f for the odd lines, it will be seen that the first occurring positive going transition 301 in any of said signals is in the SNI′ signal, and thus latch 704 is enabled to store the signal on bus 32. The next positive going transition 303 is in the SNY signal, and thus latch 706 stores the signal on bus 32. The next positive going transition 305 is in the SNQ signal, and thus latch 708 stores the signal on bus 702. The next such transition 307 is in signal SNY. The next such transition 309 is in the SNI signal. The next such one 311 is in the SNY signal and the next such transition 313 in signal SNQ. Thus the order of signals stored by the latches is I*, Y*, Q*, Y*, I*, Y*, Q*, etc. (assuming proper synchronization by decoder 710). This is exactly the order shown in FIG. 5d for the odd lines.

For the even lines the first positive going transition 302 is in the SNY signal. The next such one 304 is in the SNQ signal, the next such one 306 in the SNY signal, the next such one 308 in the SNI signal, the next such one 310 in the SNY signal, the next such one 312 in the SNQ signal. Thus the order of signals stored by the latches is Y*, Q*, Y*, I*, Y*, Q*, etc. This is the signal order shown in FIG. 5d for the even lines.

Thus the Q outputs of latches 704, 706 and 708 provide the I*, Y*, and Q* signals respectively to 8-bit buses 730, 732, and 734 respectively. Buses 730, 732 and 734 are respectively coupled to inputs of delay circuits 740, 742, and 744. Circuits 740 and 744 delay the odd line samples of the I* and Q* signals by 70 ns so there is no time shift between odd and even lines thereof because of the 70 ns delay of the even lines at the multiplexer 26. Circuit 742 delays both odd and even line samples of the Y* signal by 70 ns so there is no time shift between this signal and the I* and Q* signals. The outputs of circuits are respectively coupled to the inputs of DACs 716, 718, and 720, which DACs provide analog I, Y and Q signals at their respective outputs. These analog signals can be matrixed to provide the original R, G and B signals, if desired.

Figure 8:
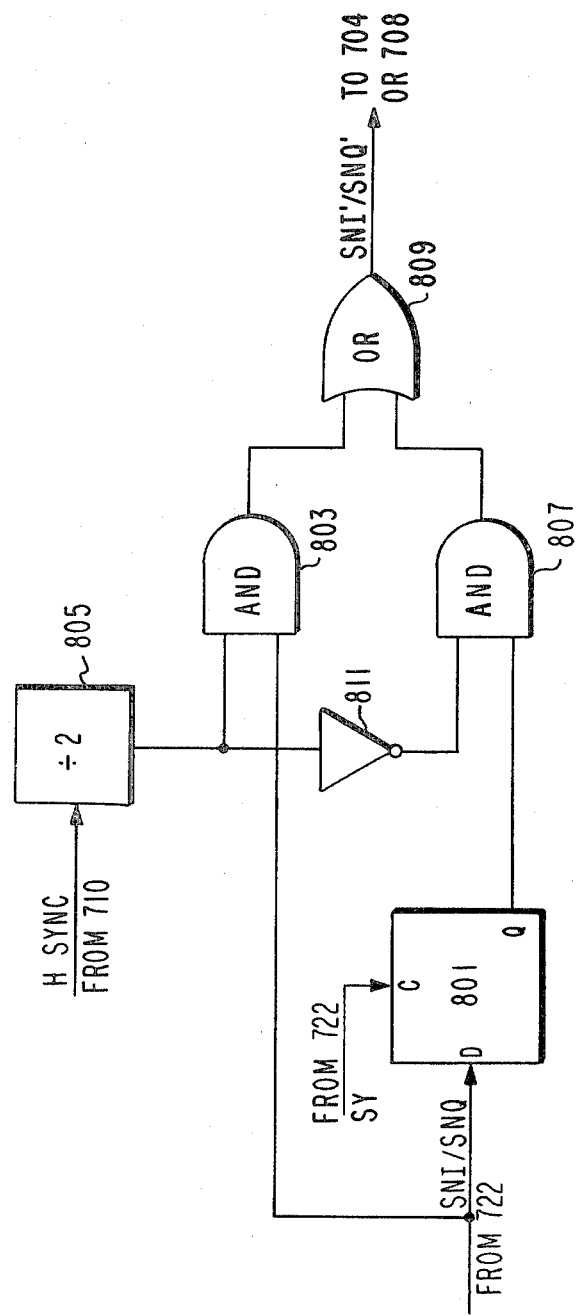
FIG. 8 is a circuit diagram of delay circuit used in FIG. 7.

FIG. 8 shows a diagram for either of the identical delay circuits 712 or 714. The SNI (or SNQ) signal from generator 722 is applied to the D input of D-type flip-flop 801 and to the lower input of AND gate 803, and the SY signal from generator 720 is applied to the C input of flip-flop 801. The horizontal sync signal is applied to the input of divide-by-two frequency divider 805. The resulting half line frequency signal is applied directly to the upper input of gate 803, and through inverter 811 to the upper input of AND gate 807. Thus gates 803 and 807 are alternately enabled on succeeding lines. The flip-flop 801 delays on the even lines the signal SNI (or SNQ) by the period (70 ns) of the SY signal applied to its clock input. The Q output is coupled to the lower input of gate 807. Gates 803 and 807 on alternate lines pass the delayed and undelayed signals to OR gate 809. The output of gate 809 comprises the signal SNI′ (or SNQ′), and said output is coupled to latch 704 (or 708).

FIG. 8 is also substantially the diagram for the delay circuits 740 and 744. In this case latch 801 is an 8-bit latch, while gates 803, 807, and 809 are 8-bit gates. Latch 801 receives at its C input the clock signal from regenerator 725, while its D input receives the I* or Q* signal. Since here it is the odd line and not the even line signals that must be delayed, the only difference in FIG. 8 is that inverter 811 must be in the input line to the upper input of gate 803 rather than that of gate 807. The output signal is derived from the output of gate 809 and applied to DAC 716 or 720.

Since the Y* signal must be delayed for both odd and even lines, circuit 742 comprises just an 8-bit latch which receives the Y* signal on bus 732 at its D input, the clock signal from regenerator 725 at its C input, and provides at its Q output the delayed signal to DAC 718.

Figure 3:
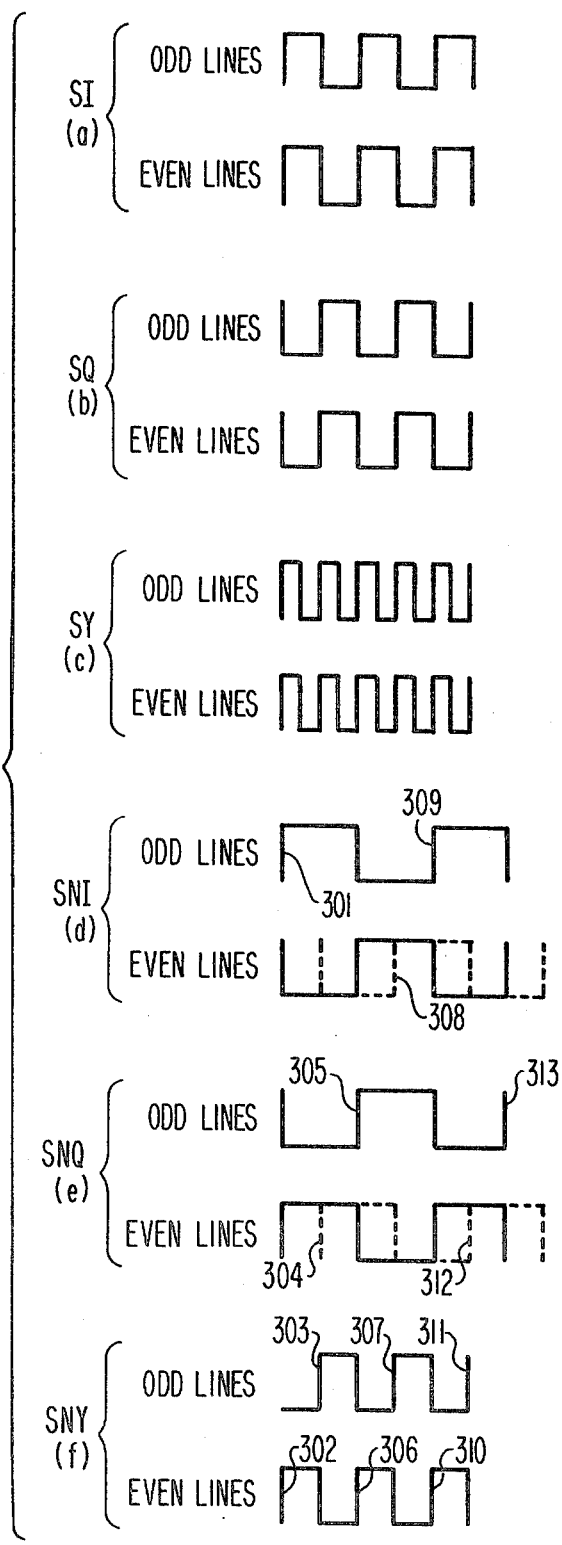
FIG. 3 is a timing diagram useful in explaining FIG. 2.

It will be appreciated that many other embodiments are possible within the spirit and scope of the invention. For example, "2+2" encoders as shown in FIG. 3 of said U.S. patent application No. 168,077 can be incorporated into each of the signal paths 403, 409 and 415. These encoders generate steering bits that allow a net reduction in the total number of bits transmitted. In this case, decoders such as shown in FIG. 4 of said application are required in each of the signal paths between delay circuits 740, 742, and 744 and DACs 716, 718, and 720 respectively.

Slight delays may be included in the clock lines to the various components as required to ensure that sequential operations occur sequentially and not simultaneously.

What is claimed is:

1. A method for time multiplexing three component signals representing a television picture, said method comprising sampling said component signals with a frequency ratio of 2:1:1 respectively, each component signal having a phase shifted sampling clock from line to line, the lower sampling frequency component signals having a mutual phase shift of the sampling clock on corresponding lines, time delaying the samples of the lower sampling frequency component signals on alternate lines, and applying the delayed and undelayed samples of the lower sampling frequency component signals and the samples of the higher sampling frequency component signal to a single channel.

2. A method as claimed in claim 1, wherein said samples comprise digital signals.

3. A method as claimed in claim 1, wherein said phase shifts are 180 degrees.

4. A method as claimed in claim 1, wherein said time delay comprises one quarter of the sampling period of the lower sampling frequency.

5. An apparatus for time multiplexing three component signals representing a television picture, said apparatus comprising means for sampling said component signals with a frequency ratio of 2:1:1 respectively, each component signal having a mutual phase shifted sample from line to line, the lower sampling frequency component signals having a phase shift of the samples on corresponding lines, means for time delaying the samples of the lower sampling frequency component signals on alternate lines, and means for applying the delayed and undelayed samples of the lower sampling frequency component signals and the samples of the higher sampling frequency component signal to a single channel.

6. An apparatus as claimed in claim 5, wherein said samples comprise digital signals.

7. An apparatus as claimed in claim 5, wherein said phase shifts are 180 degrees.

8. An apparatus as claimed in claim 5, wherein said time delay comprises one quarter of the sampling period of the lower sampling frequency.

9. An apparatus as claimed in claim 5, wherein said sampling means comprises three analog-to digital converters for said components respectively, three latches coupled to said converters respectively, and a clock generator coupled to said converters and said latches.

10. An apparatus as claimed in claim 5, wherein said time delaying means comprises a pair of latches coupled to said sampling means for receiving said lower sampling frequency component signals respectively.

11. An apparatus as claimed in claim 5, wherein said applying means comprises first, second, third, and fourth AND gates, first inputs of said first and fourth gates having a half line frequency applied thereto, first inputs of said second and third gates having a phase inverted half line frequency applied thereto, and second inputs of said first and second gates having undelayed and delay samples of one of said lower sampling frequency component signals applied thereto respectively, second inputs of said third and fourth gates having delayed and undelayed samples of the remaining lower sampling frequency component signal applied thereto, a first OR gate having inputs coupled to the outputs of said first and second AND gates respectively, and second OR gate having inputs coupled to the outputs of said third and fourth AND gates respectively and a third OR gate having first and second inputs coupled to the outputs of said first and second OR gates respectively, a third input coupled to receive samples of the higher sampling frequency component signal, and an output comprising said single channel.

12. A method for demultiplexing three time multiplexed component signals representing a television picture, said component signals being sampled with a frequency ratio of 2:1:1 respectively, each component signal having a mutual phase shifted sampling clock from line to line, the lower sampling frequency component signals having a phase shift of the sampling clock on corresponding lines, samples of the lower sampling frequency component signals being time delayed on alternate lines, the delayed and undelayed samples of the lower sampling frequency component signals and the samples of the higher sampling frequency component signal being applied to a single channel, said method comprising storing said applied samples, and time delaying all of the undelayed stored samples.

13. A method as claimed in claim 12, wherein said samples comprise digital signals.

14. A method as claimed in claim 13, further comprising digital-to-analog converting said delayed samples.

15. An apparatus for demultiplexing three time multiplexed component signals representing a television picture, said component signals being sampled with a frequency ratio of 2:1:1 respectively, each component signal having a mutual phase shifted sampling clock from line to line, the lower sampling frequency component signals having a phase shift of the sampling clock on corresponding lines, samples of the lower sampling frequency component signals being time delayed on alternate lines, the delayed and undelayed samples of the lower sampling frequency component signals and the samples of the higher sampling frequency component signal being applied to a single channel, said apparatus comprising means for storing said applied samples and means for time delaying all of the undelayed stored samples.

16. An appartus as claimed in claim 15, wherein said samples comprise digital signals.

17. An apparatus as claimed in claim 16, further comprising means for digital-to-analog converting said stored samples.

18. A method for time multiplexing three component signals representing a television picture, said method comprising generating sampling clock signals for each of said component signals with a frequency ratio of 2:1:1 respectively, each of said sampling clock signals having a phase shift from line to line, the lower frequency sampling clock signals having a mutual phase shift on corresponding lines, sampling said component signals with said clock signals, time delaying the samples of the lower sampling frequency component signals on alternate lines, and applying the delayed and undelayed samples of the lower sampling frequency component signals and the samples of the higher sampling frequency component signal to a single channel.

19. An apparatus for time multiplexing three component signals representing a television picture, said apparatus comprising means for generating sampling clock signals for each of said component signals with a frequency ratio of 2:1:1 respectively, each of said sampling clock signals having a phase shift from line to line, the lower frequency sampling clock signals having a mutual phase shift on corresponding lines, means for sampling said component signals with said clock signals, means for time delaying the samples of the lower sampling frequency component signals on alternate lines, and means for applying the delayed and undelayed samples of the lower sampling frequency component signals and the samples of the higher sampling frequency component signal to a single channel.

20. A method for time multiplexing a plurality of component signals representing a television picture, said method comprising sampling said component signals wherein certain samples are in time coincidence, time delaying selected ones of said coincidence samples so that no time coincidences between samples remain, and applying the delayed and undelayed samples to a single channel.

21. An apparatus for time multiplexing a plurality of component signals representing a television picture, said apparatus comprising means for sampling said component signals wherein certain samples are in time coincidence, means for time delaying selected ones of said coincidence samples so that no time coincidences between samples remain, and means for applying the delayed and undelayed samples to a single channel.

* * * * *